March 24, 1970    J. C. HEER    3,502,841
DEVICE FOR GUIDING AND SUPPLYING CURRENT TO A FUSIBLE FILLER
WIRE IN SHIELDING INERT GAS METAL ARC WELDING PROCESS
Filed June 14, 1965

Inventor:
Jakob C. Heer
By: Stevens, Davis, Miller & Mosher
Attorneys

United States Patent Office 3,502,841
Patented Mar. 24, 1970

3,502,841
DEVICE FOR GUIDING AND SUPPLYING CURRENT TO A FUSIBLE FILLER WIRE IN A SHIELDING INERT GAS METAL ARC WELDING PROCESS
Jakob C. Heer, Ruti Zurich, Switzerland
Filed June 14, 1965, Ser. No. 463,716
Claims priority, application Switzerland, June 26, 1964, 8,372/64; Feb. 17, 1965, 2,137/65, 2,138/65
Int. Cl. B23k 9/00
U.S. Cl. 219—130                                  5 Claims

ABSTRACT OF THE DISCLOSURE

A device for guiding and supplying current to a fusible filler wire in arc welding process shielded by inert gas, comprising a guide nipple, a conducting insert in the guide nipple, an insulator insert and a receiving head which carries the guide nipple and insulator insert. The receiving head and guide nipple form a compact body and are formed from sintered material sintered around the inserts or alternatively, the insulator insert can be press-fit or deposited in the receiving head and the conducting insert can be mechanically located in the guide nipple. The mechanical means for securing the conducting insert could be a press-fit, an abutting cap with an insulator ring interposed between the cap and the insert, a screw connection, or a spring clamp.

---

Figure 1:
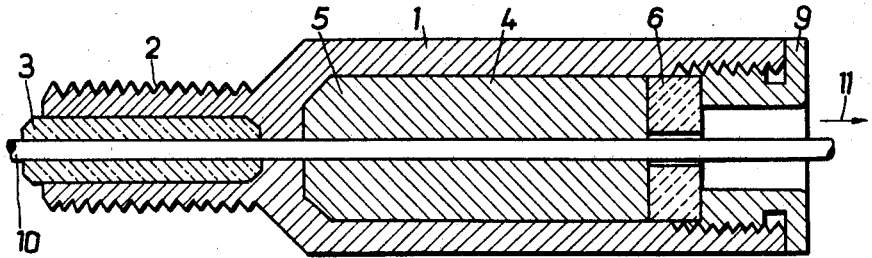

This invention relates to a device for guiding and supplying current to a fusible filler wire in a shielding inert gas metal arc welding process. In the so-called metal-inert gas process, the filler wire is mechanically unwound from a roll in a welding gun and is guided through a guide tube to the welding area, where it is fused down in the electric arc. In the previous devices, the filler wire sliding through the copper tube forms an alloy with the tube under the action of heat so that the wire is clamped in the tube, the same is burnt from its forward end and covered with scale, and heavy fluctuations of the current result.

The invention eliminates these disadvantages. The essential feature of the invention is characterized in that the apparatus comprises a receiving head, a guide nipple, and an insulator, the receiving head serving as a holder for the guide nipple and the insulator.

The receiving head may consist of metal or a metal alloy.

The guide nipple may be made from a metal-carbon alloy and may be secured in the receiving head.

Owing to the carbon, the guide nipple is wear-resistant, non-tacky and self-cleaning whereas the metal consisting of a non-ferrous heavy metal or a light metal provides for a low contact resistance between the guide nipple and the wire electrode. This results in the advantage that the wire is uniformly fed and the fluctuations of the welding current are minimized.

The guide nipple may consist of a cylindrical member, which has an axial bore for the passage of the wire electrode.

The receiving head suitably receives the guide nipple in a central opening, which is closed by a screw cap.

The mounting end of the receiving head may have an insulating insert.

Besides, a heat protection means, e.g., of ceramic material, may be provided at the outlet end of the receiving head.

The guide nipple is preferably adjustably inserted in the receiving head.

It is a further object of the invention to simplify the exchange of the guide nipple. Besides, it is an object of the invention to provide different alloys having an even higher wear resistance for the guide nipples.

The receiving head may suitably consist of sintered metal or sintered ceramics. The guide nipple may be screw-threaded in the receiving head. The receiving head may be designed so that the guide nipple can be inserted by a quick coupling into the receiving head. This embodiment has the great advantage that the non-productive time required for exchanging the guide nipple is much reduced.

In special cases, the guide nipple may consist of hard carbon.

At its lower end, the receiving head carries suitably cooling fins to improve the cooling effect of the inert gas which sweeps the guide head.

Alternatively, the guide nipple may be designed to form the lower portion of the receiving head. In this case, the remainder of the receiving head consists essentially of a tubular guide portion.

In the latter case, the receiving head and the guide nipple may be connected by a snap coupling.

It is particularly suitable to make the guide nipple from nickel aluminide, Ni-Al, bearing in mind that the guide nipple effects also the transfer of current from the receiving head to the welding wire passing through. Nickel aluminide can be made by sintering or alloying. The selection of this material has the great advantage that the wear is very low and the current transfer very good.

In a special embodiment of the invention, the sintered body of the receiving head may be sintered around the insulator. For this purpose, the insulator may consist, e.g., of alumina and may be completely prefabricated before the sinering operation whereas the sintered part of the receiving head is sintered around the insulator.

The insulator may alternatively be injected into a ceramic receiving head.

The guide nipple may also be provided with cooling fins if said nipple forms the lower part of the receiving head.

A further improvement may be obtained if the device comprises a compact body, which forms the receiving head and consists of sintered metal or sintered ceramic material, which has been sintered around an insulating insert and a conducting guide nipple insert. This arrangement has the great advantage that the compact body can be exchanged as a whole in case of damage. Besides, the manufacture is less expensive because only one part is made, compared to the use of a body composed of a plurality of individual parts.

It is particularly suitable to use hard carbon also as a material for the body and to insert the insulator into this body. In this case, the hard carbon may serve also as a guide nipple. Hard carbon has been found particularly suitable because it does not adhere, e.g., to an aluminium wire during the welding of aluminium.

It has also been found that the insulating insert may consist of alumina, a sintered ceramic material. This insulating insert may be sintered or compression-moulded into the compact body.

The conducting insert may suitably consist of nickel aluminide, Ni-Al, which is sintered or compression-moulded in situ. This material is particularly suitable also as a conducting element because it has a particularly high abrasion resistance.

The lower portion of the compact body may be provided with cooling fins so that the stored heat may be dissipated by the sweeping inert gas.

It is highly suitable to provide highly conductive parts, which are inserted into or sprayed onto the compact body. This is suitable where the body consists, e.g., of sintered ceramic material, which in some cases does not have the same high conductivity as, e.g., sintered metal. The highly conductive parts, e.g., of metal, may also be pressed into the body to reinforce the transitional portion between the upper and lower shanks so that the danger of a breaking-off of the lower portion is further reduced.

In practice it has already been found that the insulating insert may be formed by building up ceramic material in the compact body, e.g., by means of a spray gun. The same applies to the conducting insert.

Figure 2:
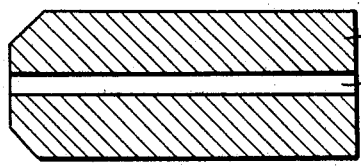
Figure 3:
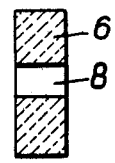
Figures 4, 5, 6, 7, 8, 9, 10:
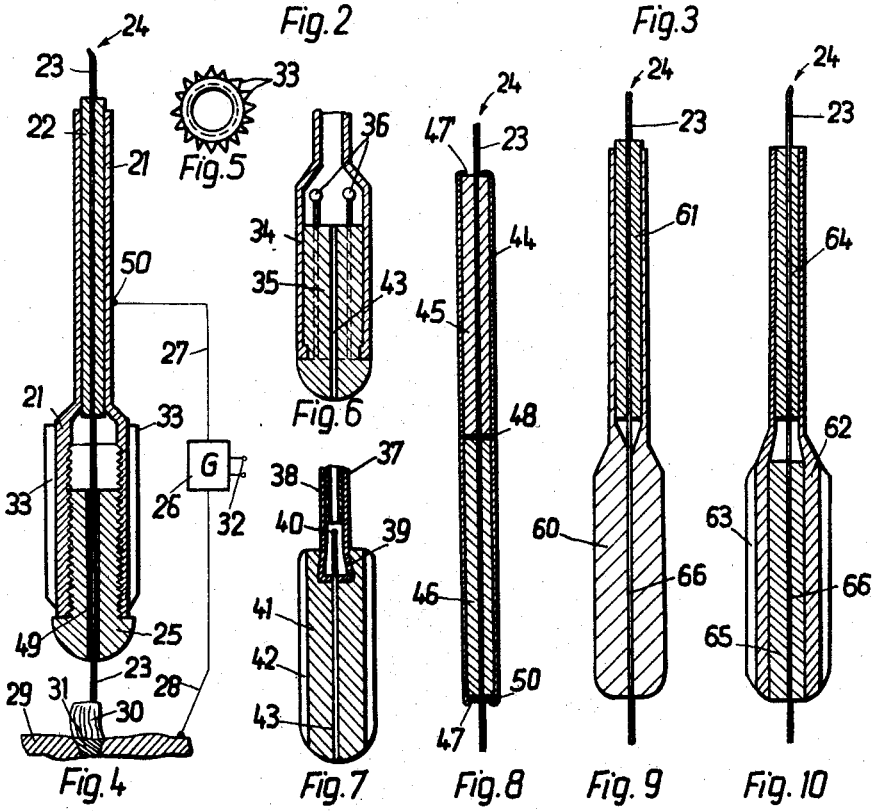

Some embodiments of the invention are shown by way of example on the accompanying drawings, in which FIG. 1 is a longitudinal sectional view showing a receiving head provided with a guide nipple, FIG. 2 is a longitudinal sectional view showing a guide nipple, FIG. 3 is a longitudinal sectional view showing a heat protection ring, FIG. 4 is a diagrammatic sectional view showing a receiving head, FIG. 5 is a bottom view showing the receiving head with the guide nipple removed, FIG. 6 is a fragmentary sectional view of another embodiment of a receiving head, FIG. 7 is a fragmentary sectional view showing a further embodiment of a receiving head, FIG. 8 is a diagrammatic sectional view showing a still further embodiment of a receiving head, FIG. 9 is a diagrammatic sectional view showing an embodiment of the invention, and FIG. 10 is a diagrammatic sectional view showing a further embodiment of the invention.

With reference to FIG. 1, the receiving head 1 carries at its mounting end a threaded extension 2 for a threaded connection to a welding gun, not shown. A tube 3 of insulating material is inserted in the threaded extension 2. A central opening 4 of the receiving head 1 serves for holding a guide nipple 5 according to FIG. 2 and a ceramic heat protection ring 6 according to FIG. 3. The guide nipple 5 has an axial bore 7 and the ceramic ring 6 has a similar bore 8. The guide nipple 5, which is inserted in the opening 4 of the receiving head 1, and the ring 6 are held in position by a screw cap 9.

The device is arranged so that the filler wire 10 can be moved through the receiving head 1 in the direction of the arrow 11. The axial bore 7 in the guide nipple 5 is highly constricted. The bore 8 of the ring 6 and the remaining passages in the receiving head 1 are wider. For this reason, the guide nipple 5 constitutes the guide element proper for the filler wire 10. At this point, the filler wire is guided and supplied with current.

In FIG. 4, the receiving head 21 is designed to receive in its upper portion the tubular insulator 22. The guide nipple 25 is screw-threaded into the lower portion of the receiving head 21. The welding wire 23 is supplied in the direction of arrow 24 from the welding gun, moves through the central bore of the insulator 22 into the bore 49 of the guide nipple 25, merges at the lower end and forms at 30 in the flame arc the seam weld 31 on the workpiece 29. For this purpose, voltage and current are supplied by the generator 26, which is fed from the supply system 32. The required current is fed by lead 27 to the upper portion of the receiving head and by lead 28 to the workpiece 29. From the terminal 50, the current flows through the shell of the receiving head 21 and the guide nipple 25 and is transferred to the welding wire 23 where the latter contacts the bore 49.

Special cooling fins 33 are provided on the lower portion of the receiving head 21.

The guide nipple 25 can be relatively easily unscrewed and exchanged when it has become worn. In this case, the receiving head and the insulator need not be discarded but are both preserved. Only a new guide nipple is screwed in.

FIG. 5 shows the underside of a receiving head from which the guide nipple has been removed. It is clearly apparent how the cooling fins 33 may be arranged.

FIG. 6 shows a receiving head which has been modified, particularly in its lower portion 34. The guide nipple 35 is slidably fitted into the lower portion 34 of the receiving head without screw threads, and is retained by the resilient lower portion 34. For this purpose, the lower portion 34 is formed with slots 36, which provide for a certain spring action. The guide nipple 35 can be inserted and pushed out with the aid of a suitable tool.

In FIG. 6, the welding wire has been omitted. This wire extends through the central bore 43.

FIG. 7 shows a further embodiment of the guide nipple 41, which forms the lower portion of the receiving head. The welding wire has been omitted in FIG. 7.

The welding wire would extend through the central bore 43 of the guide nipple 41, which is preferably provided with cooling fins 42 in this embodiment. An undercut bore 39 is provided in the upper portion of the guide nipple 41. The remaining part of the receiving head 37 can snap into this bore and is provided at its lower end with slots 40. The insulator is formed by building up ceramic material in the receiving head 37. For this purpose, the layer 38 is applied by spraying ceramic material or by other processes.

FIG. 8 shows a further embodiment of the invention. In this case, the receiving head 44 consists of a smooth tube, which is similar to the top portion of the receiving head in FIG. 4. The ends of the tube are slightly conically tapered and somewhat longer than the tubes inserted into this tubular receiving head and consisting of the insulator 45 and the guide nipple 46. During the manufacture, the two tubes 45 and 46 are inserted into the receiving head, which consists of a smooth tube. The slightly conically tapered lower end 47 and upper end 47' are then inturned so that the two tubular inserts are firmly connected to the receiving head.

Alternatively, the receiving head may consist of a smooth tube 44, to which the guide nipple 46 is firmly connected in the lower portion by inturning the end 47 and by spinning a small groove 48 into the intermediate portion of the receiving head 44. The insulating tube 45 is merely slidably fitted into the upper portion, which is not inturned at 47'. The insulating tube 45 protrudes slightly beyond the upper portion of the receiving head so that the insulating tube is detachable, as in the embodiment of FIG. 4. This enables a repeated use of the insulating tube, which is hardly worn in operation, so that the receiving head is further improved and reduced in cost. The receiving head may be made of copper or steel.

The welding wire 23 is fed through the central bore and just as in FIG. 4 is advanced in the direction of arrow 24. The bore in the insulator may be somewhat wider so that the welding wire is not excessively snubbed in the insulating tube. The bore in the guide nipple 46 will be dimensioned so that a good contact between the welding wire and the guide nipple is achieved throughout the length of the latter.

To improve the heat lagging properties and to further reduce the wear, a ceramic plate 50 may be additionally pressed into the lower portion.

The wear may be further reduced if a conducting hard metal plate is inserted instead of a ceramic plate.

FIG. 9 shows a compact body 60, which is sintered or moulded around an insulating insert 61. Alternatively, the insulating insert may be merely slidably fitted. The welding wire 23 is supplied in the direction of the arrow 24 and moves through the insulating insert 61 and the lower bore 66 of the body 60.

The bore in the insulating insert 61 is somewhat wider than the bore 66 in the body 60 and is sized to ensure an appropriate current transfer to the welding wire 23.

FIG. 10 shows a further embodiment of the invention. The body 62 consists also of sintered metal or sintered ceramic material. The periphery of the lower portion of this body may be provided with cooling fins 63, which are swept by the shielding gas so that the body 62 is cooled.

The upper portion of the body 62 is sintered or moulded around an insulating insert 64. The lower portion of the body 62 is moulded or sintered about a conducting insert 65. The insulating insert may be made particularly from materials such as alumina, $AlO_3$, or other insulating materials which resist the temperatures to be expected.

The conducting inserts 65 may consist particularly of carbon-metal compounds or of nickel aluminide, Ni-Al. It is also possible to use appropriately sintered hard metals.

In a special embodiment, highly conductive parts may be inserted into or sprayed onto the compact body, particularly when the latter consists of sintered ceramic materials, which are not as highly conductive as sintered metals.

Alternatively, the body 60 may be made from hard carbon and the insulating insert 61 may be firmly pressed into the body or detachably connected to it. This embodiment has the special advantage that it is relatively inexpensive and has nevertheless a high stability.

What is claimed is:

1. A device for guiding and supplying current to a fusible filler wire in a shielding inert gas metal arc welding process, said device comprising a receiving head having an axial bore therethrough, means for connecting one end of said head to a welding gun, a ceramic insulating tube inserted into said bore at said one end, a guide nipple inserted into the other end of said bore, a heat protection ring and screw cap means mounted in said other end of the bore and holding said guide nipple in place, said insulating tube, guide nipple, heat protection ring and screw cap means each having an axial bore which, when assembled, form a passage for said fusible filler wire.

2. A device according to claim 1 in which said receiving head is formed from material selected from the group consisting of metals and metal alloys.

3. A device according to claim 1 in which said ceramic insulating tube is made of $Al_2O_3$.

4. A device according to claim 1 in which said guide nipple is formed from material selected from the group consisting of metal-carbon alloys, nickel aluminide and hard carbon.

5. A device according to claim 1 in which said heat protection ring consists of a plate of material selected from the group consisting of ceramic materials and hard metals.

References Cited

UNITED STATES PATENTS

| | | | |
|---|---|---|---|
| 2,478,525 | 8/1949 | Cutrer | 219—130 |
| 2,735,920 | 2/1956 | Valliere | 219—130 |
| 2,727,970 | 12/1955 | Turbett | 219—130 |
| 2,761,049 | 8/1956 | McElvath et al. | 219—130 |
| 2,805,323 | 9/1957 | Cushman | 219—130 |
| 3,007,032 | 10/1961 | Whiteman | 219—130 |
| 3,018,360 | 1/1962 | Engel | 219—130 |

JOSEPH V. TRUHE, Primary Examiner

J. G. SMITH, Assistant Examiner

U.S. Cl. X.R.

219—136